US006123884A

United States Patent [19]

Lundgren et al.

[11] Patent Number: 6,123,884

[45] **Date of Patent: *Sep. 26, 2000**

[54] METHOD OF MANUFACTURING LIGNOCELLULOSIC BOARD

[75] Inventors: Göran Lundgren, Alnö ; Kurt Schedin; Lars-Otto Sislegård, both of Sundsvall; Sven-Ingvar Thorbjörnsson, Karlstad, all of Sweden

[73] Assignee: Valmet Fibertech Aktiebolag, Sweden

[ * ] Notice: This patent issued on a continued prosecution application filed under 37 CFR 1.53(d), and is subject to the twenty year patent term provisions of 35 U.S.C. 154(a)(2).

[21] Appl. No.: 08/930,846

[22] PCT Filed: Mar. 11, 1996

[86] PCT No.: PCT/SE96/00310

§ 371 Date: Oct. 7, 1997

§ 102(e) Date: Oct. 7, 1997

[87] PCT Pub. No.: WO96/31327

PCT Pub. Date: Oct. 10, 1996

[30] Foreign Application Priority Data

Apr. 7, 1995 [SE] Sweden .................................. 9501300

[51] Int. Cl.[7] ........................... B29C 33/04; B29C 43/20; B29C 43/46

[52] U.S. Cl. .......................... 264/113; 264/116; 264/119; 264/123

[58] Field of Search ..................................... 264/115, 109, 264/112, 113, 118, 121, 123; 425/363, 373, 394, 404; 156/285, 311

[56] References Cited

U.S. PATENT DOCUMENTS

| | | | |
|---|---|---|---|
| 3,230,287 | 1/1966 | Caron et al. | 264/120 |
| 3,907,630 | 9/1975 | Selander | 162/225 |
| 4,175,150 | 11/1979 | Luck et al. | 428/171 |
| 4,378,265 | 3/1983 | Kiss | 156/242 |
| 4,393,019 | 7/1983 | Geimer | 264/83 |
| 4,517,147 | 5/1985 | Taylor et al. | 264/83 |
| 4,810,445 | 3/1989 | Lamb, Sr. et al. | 264/115 |
| 4,923,656 | 5/1990 | Held | 264/109 |
| 4,976,905 | 12/1990 | Brown | 264/115 |
| 5,063,010 | 11/1991 | Fischer et al. | 264/109 |
| 5,195,428 | 3/1993 | Gawlitta et al. | 100/73 |
| 5,302,332 | 4/1994 | Simola et al. | 264/115 |
| 5,342,566 | 8/1994 | Schäfer et al. | 264/115 |
| 5,433,905 | 7/1995 | Tisch | 264/118 |
| 5,435,954 | 7/1995 | Wold | 264/115 |
| 5,482,666 | 1/1996 | Larsson | 264/115 |
| 5,492,756 | 2/1996 | Seale et al. | 264/115 |
| 5,658,407 | 8/1997 | Thorbjornsson | 264/109 |
| 5,711,972 | 1/1998 | Schedin et al. | 425/363 |
| 5,728,269 | 3/1998 | Kohno et al. | 264/124 |
| 5,902,442 | 5/1999 | Philips et al. | 156/296 |

FOREIGN PATENT DOCUMENTS

| | | |
|---|---|---|
| 0 383 572 B1 | 11/1994 | European Pat. Off. . |
| 2058820 | 5/1972 | Germany . |
| 36 40 682 A1 | 6/1988 | Germany . |
| 9520473A1 | 8/1995 | WIPO . |

*Primary Examiner*—Angela Ortiz
*Attorney, Agent, or Firm*—Lerner, David, Littenberg, Krumholz & Mentlik, LLP

[57] ABSTRACT

Methods for the continuous manufacture of board from lignocellulose-containing material are disclosed including disintegrating the lignocellulose material into particles or fibers, drying, coating with glue, forming the glued board into a mat, heating the mat with steam, compressing the heated mat to a predetermined thickness approximately equal to the final desired thickness of the board, and pressing the compressed mat into the board.

10 Claims, 1 Drawing Sheet

METHOD OF MANUFACTURING LIGNOCELLULOSIC BOARD

FIELD OF THE INVENTION

The present invention relates to a method for the continuous manufacture of board from lignocellulosic material.

BACKGROUND OF THE INVENTION

Methods of manufacturing board from raw materials based on lignocellulose are well-known, and are now widely in use. These methods of manufacture generally comprise the following steps: disintegration of the raw material into particles and/or fibers of a suitable size, drying to a definite moisture ratio and glue-coating the material prior to or after the drying step, forming the glue-coated material into a mat, which can be built-up from several layers, possibly cold pre-pressing, pre-heating, nozzle-spraying of the faces, as well as hot pressing during the simultaneous application of pressure and heat in a discontinuous or continuous press into the form of a finished board.

During conventional hot pressing the pressed material is normally heated substantially only by thermal conduction from adjacent heating plates or steel belts, which have a temperature of between about 150 and 250° C., depending on the type of pressed product being utilized, the type of glue being used, the desired capacity, etc. In this manner, the moisture of the material closest to the heat sources is vaporized, whereby a dry layer develops, and a steam front moves successively inwardly to the core of the board from each side as the pressing process proceeds. When the dry layer develops, a temperature of at least 100° C. prevails in this layer, which initiates the curing of normal glues. When the steam front has arrived at the core, a temperature of at least 100° C. has been reached at the core, and the board also begins to harden at this point, whereafter the pressing can be finished within seconds. This applies to the use of conventional urea-formaldehyde glues (UF) and the like, such as melamine-reinforced (MUF) glues. When using other types of glues with higher curing temperatures, a higher temperature and a higher steam pressure must be developed in the board before hardening can take place.

In order to provide desired board properties, a press must be capable of applying high face pressures at high temperatures. This is not a problem on its face for a discontinuous press which, however, has other disadvantages, such as inferior thickness tolerances, etc. In continuous presses the requirement of high face pressures with simultaneously high temperatures has created the necessity for expensive precision solutions as regards the roller bed between a steel belt and the underlying heating plate.

The method of introducing heat to the board by means of thermal conduction also makes it necessary for the heating to a relatively long time, which results in long press lengths (i.e., large press surfaces). Presses up to a length of about 40 meters have thus been utilized. Besides, during the use of known continuous presses it is practically impossible to make the heating plates sufficiently flexible, so that density profiles cannot be formed as freely as is the use with discontinuous pressing.

Another method of board manufacture which is based on the introduction of steam between the heating plates in a discontinuous press has also been used to a limited extent. Since during the supply of steam the material is heated in a matter of seconds, the heating time is radically shortened. Furthermore, the compression resistance of the material is reduced considerably when steam has been supplied. This is a positive feature, which implies that the press could be designed with less press power and with a substantially shorter length (i.e., smaller press surface). In order to obtain the desired properties of a board manufactured according to this method, however, it has been necessary to apply conventional pressing techniques with high surface pressures and thermal conduction from conventional heating plates at the beginning of the press cycle, whereby after a long period of heating a face layer with a high density has been obtained. It was initially possible to thereafter blow in steam in order to heat the core portion of the board. This, however, has involved problems, because the steam had to be blown through the newly formed high density face layer, and because the pressing time has been extended considerably during the period of high pressure and thermal conduction. Due to all this, a steam press operating according to this concept has a substantially lower capacity, and alternatively requires a larger press surface and higher press power than would be necessary when uniform density is desired.

During all of the manufacturing methods mentioned above, a soft face layer with lower strength, unacceptable paintability, etc., is obtained, which requires this layer to be ground off. The resulting material loss amounts to about 5 to 15%, depending on board type, its thickness, etc.

It is an object of the present invention to provide a novel manufacturing process for the continuous pressing of board based on lignocellulose material, by which method it is possible to utilize the advantages of steam heating, which implies that the equipment can thus be designed with a substantially smaller press surface and lower press power, i.e., it is less expensive. Furthermore, it can now be designed without heating plates, which renders the equipment still less expensive, and thereby producing a board with a substantially uniform density profile, which can be used in that state, or be further refined.

SUMMARY OF THE INVENTION

In accordance with the present invention, these and other objects have now been realized by the invention of a method for the continuous manufacture of a board from lignocellulose-containing material comprising disintegrating the lignocellulose-containing material into the form of particles or fibers, drying the disintegrated lignocellulose-containing material to produce a dried intermediate board, coating the dried intermediate board with glue to produce a glued intermediate board, forming the glued intermediate board into a mat, heating the mat with steam to produce a heated mat, compressing the heated mat to a predetermined thickness, the predetermined thickness being approximately the final desired thickness of the board, and pressing the compressed mat into the board. Preferably, the forming of the mat is carried out to a predetermined density in order to control the density of the outer surfaces of the mat.

In accordance with one embodiment of the method of the present invention, the compressing of the heated mat to the predetermined thickness comprises a thickness below the final desired thickness, and the method includes permitting the compressed mat to expand to that final desired thickness prior to the pressing step.

In accordance with another embodiment of the method of the present invention, the forming of the mat is carried out utilizing roller means, and the method includes heating the mat with the steam in an amount greater than that required for the heating step, whereby air contained within the mat is pressed rearwardly in the mat.

In accordance with another embodiment of the method of the present invention, the pressing of the compressed mat is carried out utilizing press roller means, whereby residual steam in the compressed mat can escape between the press roller means.

In accordance with another embodiment of the method of the present invention, the method includes adding additional steam during the pressing step whereby an adequately high temperature is provided during production of the board.

In accordance with another embodiment of the method of the present invention, the method includes hot calendering the board subsequent to the pressing step whereby fine calibration or modification of the density of the surface of the board is obtained. In a preferred embodiment, the method includes hot calendering the board to a predetermined density for the surfaces of the board, the predetermined density being above the final desired face density of the surfaces of the board.

According to the present invention, the pressing is carried out so that the mat formed thereby is heated with steam and thereafter compressed to a thickness near the final desired thickness, whereafter it is pressed to a manageable board with a uniform density profile or with a slightly increased face density.

According to one embodiment of the present invention, the mat is compressed to a modest density, whereafter steam is supplied. The mat is thereafter compressed further to a density above the final desired density, whereafter the mat is allowed to expand slightly and to harden to such a degree that a manageable board is obtained.

In a preferred embodiment of the process of the present invention, the mat produced from the forming step (which can either not be pre-pressed or can be cold pre-pressed in a separate belt pre-press if it is desired to better clear belt transitions and to be able to more easily indicate possible metal) is first compressed in a press inlet to a roller press provided with wires to a density of about 150 to 700 kg/m$^3$, whereafter gas or steam of controlled pressure and a degree of overheating is supplied through the faces by means of steam chest(s) and/or steam roller(s). The mat is hereafter compressed successively to a thickness less than the final desired thickness by means of roll pairs, whereafter it is allowed to expand in additional roll pairs, whereafter the board hardens.

The roller press should also be heated in order to prevent condensation during the steam supply. The object of compression to a thickness less than the final desired thickness is to compress the mat strongly, so that smaller loads are obtained in subsequent roll pairs. This method is desirable in order to reduce the loads on the machine, but is not necessary for the process hereof.

The compression of the mat is of importance in connection with the density profile of the pressed board. By adjusting the mat density, during which steam is supplied, the face density of the board can be controlled. With increasing mat density, the density of the pressed board changes from a uniform density profile to a density profile with an increased face density. Such an increase in the mat density, however, implies an increase in compression work in the inlet zone of the mat.

In an alternative embodiment of the present invention, the mat is heated in the manner described above, but continued compression in a calibration section does not take place longer than that required to provide a thickness near the final desired thickness, whereafter the board is exposed to high heat and line loads in a hot calendering section. In this manner a board with increased face density is obtained.

In this embodiment, the mat is compressed in the inlet wedge to a modest density, whereafter steam is supplied in a similar manner as described above. The mat is then compressed further to a thickness near that of the final desired thickness and is allowed to partially harden in a calibration section, whereby the board becomes sufficiently stable for continued transport to a hot calendering section, where the board is compressed between roll pairs with supplied heat and pressure to a high density, whereafter it is allowed to spring back to its final desired thickness in the outlet.

Contrary to all previously known presses for manufacturing board based on lignocellulose material, it has been found that from a process-technological point of view it is now possible to obtain such board with good properties even at high densities in spite of the absence of heating plates.

During the application of the method according to the present invention, the steam is supplied continuously. When a small excess of steam above the amount required for heating the mat is supplied, this ensures that all of the air which might be enclosed in the mat is pressed rearward in the inlet, whereby it is further ensured that all parts of the mat are heated.

BRIEF DESCRIPTION OF THE DRAWINGS

The present invention may be more fully appreciated with reference to the following detailed description in which.

DETAILED DESCRIPTION

Figure 1:
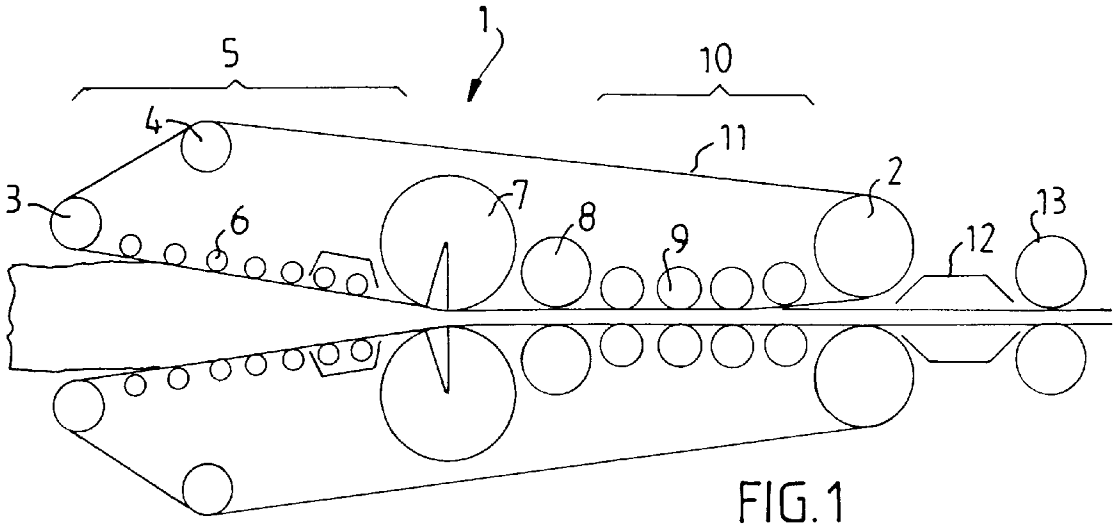
FIG. 1 is a side, schematic representation of a heated belt press with a steam supply in accordance with the present invention.

Referring to the Figures, FIG. 1 is a lateral view of equipment used in a process according to the present invention, comprising a belt press 1 and a hot calendering section 13. The belt press 1 is provided in known manner with drive rollers 2, drawing rollers 3, and guide rollers 4, as well as an adjustable inlet portion 5 with inlet rolls 6, at least one steam roller 7, at lest one compression roll 8, calibrating rolls 9 in a calibration section 10 and a surrounding wire 11, or alternatively, a perforated steel belt with wire. The mat is compressed in the inlet portion 5 to a predetermined density in the range of bout 150 to 700 kg/m$^3$, preferably in the range of about 250 to 500 kg/m$^3$ during the passage past the steam roller 7, whereby steam of from about 1 to 6 bar is injected into a sector in contact with the wire in an amount sufficient to heat the mat to about 100° C. and drive out all included air. The compression resistance of the mat is thereby reduced significantly, and continued compression by means of the compression roll 8 and in the calibration section 10 can be carried out with very small forces.

In an alternative embodiment, a conventional steam chest can be used at the beginning of the calibration section in order to ensure a sufficiently high temperature during the hardening of the board (depending on the board type, etc.).

Due to the use of only rolls, excess steam is free to flow off through the wire, and therefore no vacuum sucking-off zone is normally required at the end of the calibration section. In an alternative embodiment, a vacuum box can be installed in order to facilitate the control of residue moisture and the de-flashing of excess steam.

As an alternative or complement to the steam roller 7, one or several conventional steam chests can also be utilized.

When it is desired to improve the density and tightness of the face layer and/or to fine calibrate the thickness measure of the board and/or to provide the board with a suitable pattern or face structure, the board can pass through a section with one or more hot calendering rolls 13 with high surface temperatures, possibly preceded by a section 12 where suitable steam, gas or liquid can be supplied as a pre-preparation. The hot calendering rolls, as an alternative, can also be surrounded by an endless steel belt.

Figure 2:
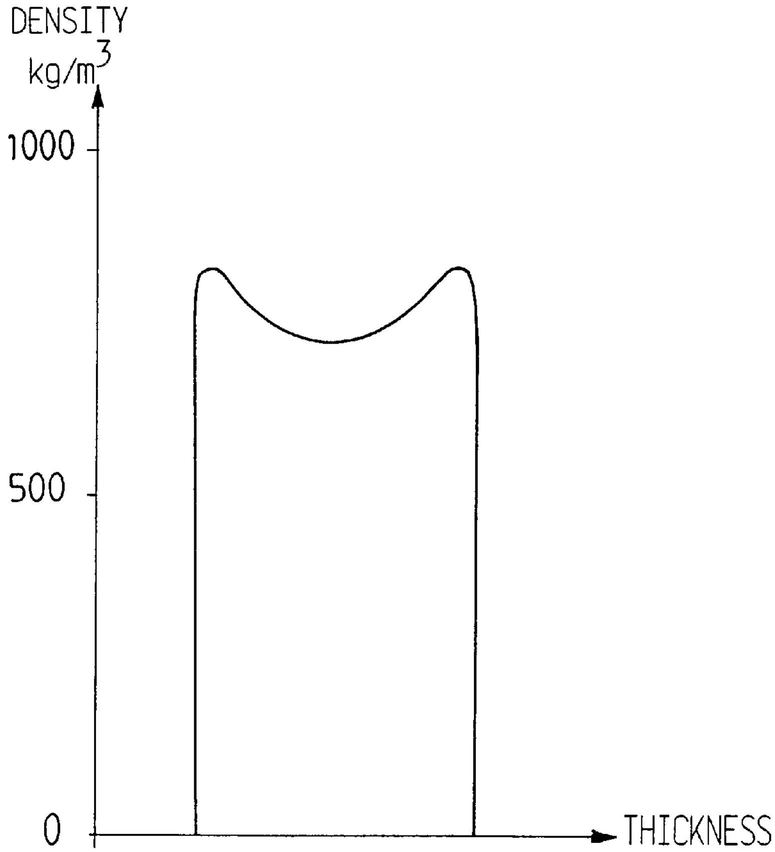
FIG. 2 is a graphical representation of the density in the direction of the thickness of the board produced in accordance with the present invention.

A uniform density profile, as mentioned, can be obtained by supplying the steam during a low or modest mat density, and without additional treatment by hot calendering rolls. In FIG. 2 a density profile is thus shown, which can be brought about in the case of thin board (for example, about 1 mm), substantially by passing the board through such hot calendering rolls. Still higher face density tops can be achieved by the use of a hot calendering section with roll pairs enclosed by hot steel belt, whereby the board in the hot calendering section is compressed to a face density slightly higher than the desired final face density at high temperatures (e.g., about 150 to 300° C.) and be passed through a number of roll pairs and thereafter be expanded to the final desired thickness.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A method of continuously manufacturing a board from a mat of lignocellulose-containing material comprising the steps of: compressing said mat of lignocellulose-containing material to a pre-determined thickness using a roller while steam heating said mat during said compression step so as to form a board, said steam heating being accomplished by introducing steam through said roller.

2. The method of claim 1 wherein said mat of lignocellulose-containing material is compressed and heated so as to form a board without the use of opposed heated plates.

3. The method of claim 1 wherein said predetermined thickness is the final thickness of said board.

4. The method of claim 1 further comprising the step of allowing said board to expand after said compression step from its pre-determined thickness to a greater thickness so as to form an expanded board having a final thickness.

5. The method of claim 4 further comprising the step of compressing said expanded board prior to attaining said final thickness.

6. The method of claim 1 further comprising the step of pressing said mat in a calibration section of a press following said compressing step.

7. The method of claim 6 wherein said calibration section includes at least one compression roll which applies relatively small force.

8. The method of claim 6 further comprising at least one steam chest, located at the beginning of the calibration section capable of applying additional steam to said mat after said compressing step.

9. The method of claim 1 further comprising pressing said compressed mat utilizing pressed roller means, whereby residual steam in said compressed mat can escape between said pressed roller means.

10. The method of claim 1 further comprising adding additional steam subsequent to said compressing step whereby an adequately high temperature is provided during production of said board.

* * * * *